Figure 1:
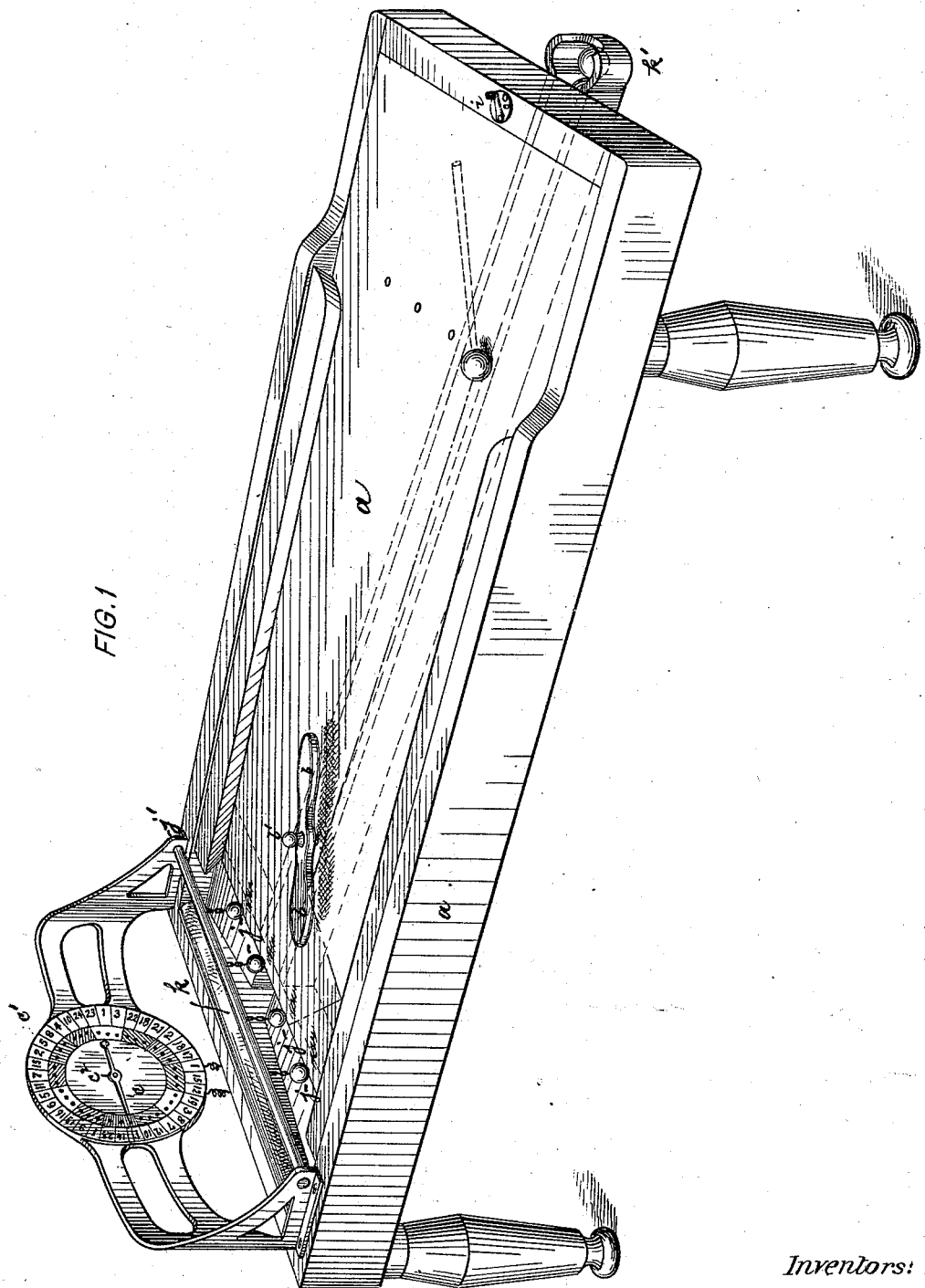

(No Model.) 2 Sheets—Sheet 1.

W. & E. MUMBRAUER.
BILLIARD TABLE.

No. 560,739. Patented May 26, 1896.

Witnesses:
John Becker,
W. G. Whiting

Inventors:
Wilhelm Mumbrauer &
Edmund Mumbrauer
by their attorneys
Roeder & Briesen (No Model.) 2 Sheets—Sheet 2.
W. & E. MUMBRAUER.
BILLIARD TABLE.
No. 560,739. Patented May 26, 1896.
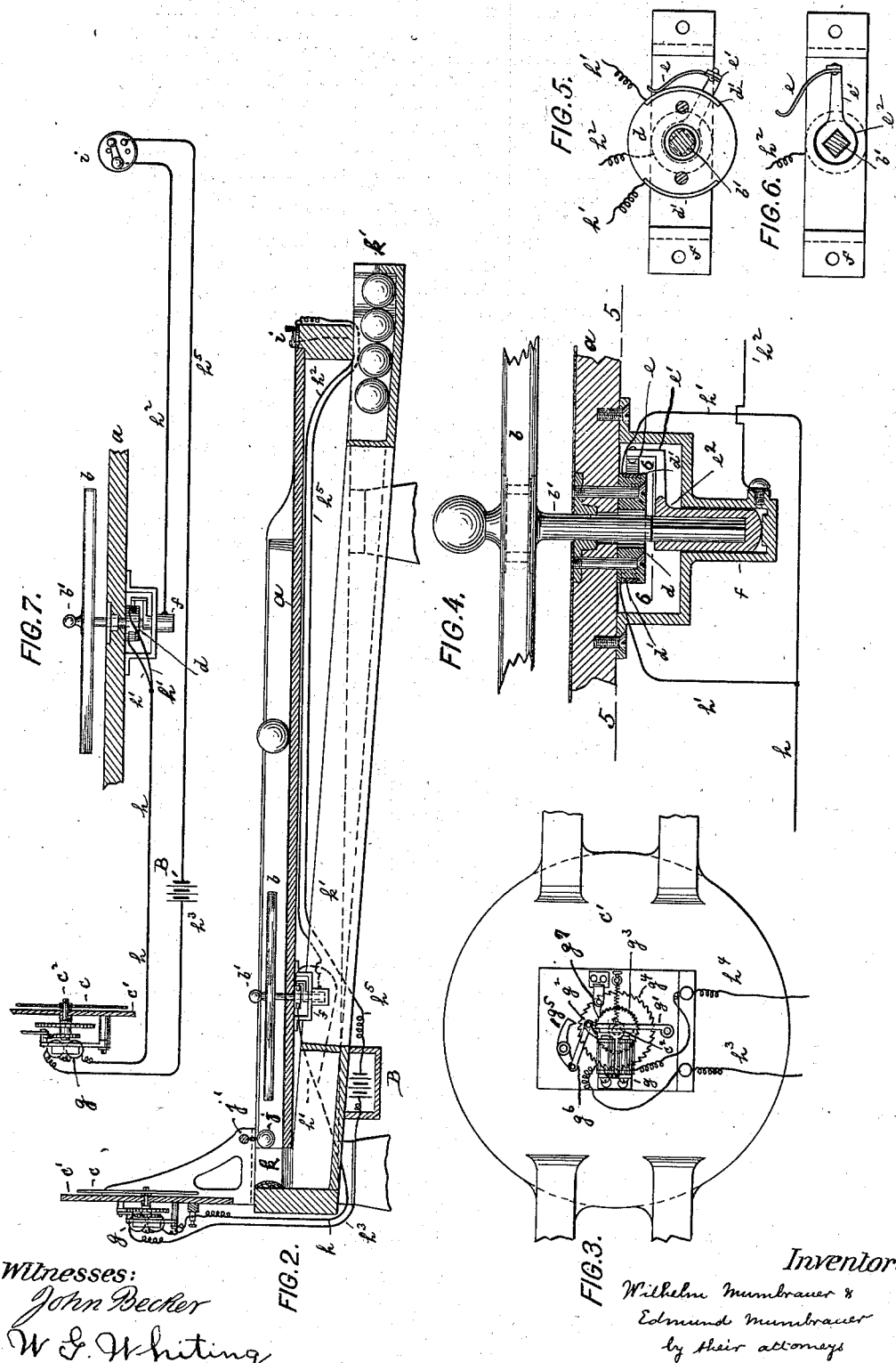
Witnesses:
John Becker
W. F. Whiting
Inventors.
Wilhelm Mumbrauer &
Edmund Mumbrauer
by their attorneys
Roeder & Briesen

UNITED STATES PATENT OFFICE.

WILHELM MUMBRAUER AND EDMUND MUMBRAUER, OF NEW YORK, N. Y.

BILLIARD-TABLE.

SPECIFICATION forming part of Letters Patent No. 560,739, dated May 26, 1896.

Application filed March 3, 1896. Serial No. 581,672. (No model.)

*To all whom it may concern:*

Be it known that we, WILHELM MUMBRAUER, a citizen of the United States, and EDMUND MUMBRAUER, a citizen of Germany, residents of New York city, New York, have invented an Improved Billiard-Table, of which the following is a specification.

This invention relates to a billiard-table of novel construction and on which a novel and interesting game can be played.

The invention consists principally in pivoting to the table within reach of the play-ball a horizontally-revoluble arm, which upon being struck and rotated will cause a pointer to be moved over a dial.

The invention also consists in the other features of improvement fully pointed out in the claims.

In the accompanying drawings, Figure 1 is a perspective view of our improved billiard-table. Fig. 2 is a vertical longitudinal section thereof; Fig. 3, a rear view of the dial, showing the electric mechanism for operating the pointer; Fig. 4, a vertical section through part of the table, showing the contact mechanism actuated by the pivoted arm $b$; Fig. 5, a horizontal section on line 5 5, Fig. 4; Fig. 6, a horizontal section on line 6 6, Fig. 4; and Fig. 7, a diagram illustrating the arrangement of the circuit-wires.

The letter $a$ represents a billiard-table of suitable size and configuration. To the bed-plate of the table $a$ there is pivoted a revoluble arm $b$, which is placed a short distance above the cloth and within reach of the play-ball. This arm is so connected to a pointer $c$, moving over a dial $c'$, which is affixed to the head of the table, that the rotation of the arm will cause the pointer to move over the dial. The connection between pivoted arm and pointer is preferably effected by means of an electric circuit, but may of course be differently constructed.

In the example illustrated in the drawings the mechanism is as follows: The spindle $b'$ of arm $b$ passes through the bed of the table $a$ and is surrounded by an insulating-ring $d$, affixed to the lower side of the table. This ring has two (more or less) metallic contacts $d'$ $d'$, Fig. 5, and is engaged by the metallic spring $e$, connected by arm $e'$ to a squared metal socket $e^2$, which receives the squared lower end of the spindle $b'$, so as to revolve with the same. The socket $e^2$ is stepped in a metallic bearing or socket $f$, which is secured to the table $a$ and surrounds the contact mechanism described. The contacts $d'$ are so connected by the battery-wires to an electromagnet $g$, placed back of pointer $c$ and adapted to operate the same, that when the parts $d'$ $e$ are in contact the circuit is closed and the pointer will advance one space upon the dial. If, therefore, two contacts $d'$ are provided upon the insulating-ring $d$, each revolution of the arm $b$ will advance the pointer two numbers, the entire advance of the pointer being dependent upon the impetus given to the arm.

If the circuit is closed, the current travels as follows: from battery B, by wire $h^3$, to electromagnet $g$, thence by wire $h$ and branches $h'$ to contacts $d'$, thence through spring $e$, arm $e'$, socket $e^2$, socket $f$, to wire $h^2$, thence to a circuit-closer $i$, secured to the front of the table and which serves to interrupt the circuit and prevent the arm $b$ from rotating the pointer $c$, if desired. From the circuit-closer $i$ the current travels over wire $h^5$ back to the battery B. If the spring $e$ is not in contact with $d'$, but with one of the insulating sections of ring $d$, the circuit is broken and the armature $g'$ of the electromagnet $g$, will not be attracted nor the pointer advanced. If, therefore, the circuit is closed at $i$ and the arm $b$ is revolved by impact from the play-ball, the circuit will be alternately opened and closed to vibrate the armature in the well-known manner and advance the pointer $c$.

The movement of the armature may be transmitted to the pointer in any suitable manner. We have shown the following construction, Fig. 3: To the armature is pivoted a pawl $g^2$, engaging a ratchet-wheel $g^3$, fast on the spindle $c^3$ of the pointer $c$. Upon this spindle is also mounted a second ratchet-wheel $g^4$, engaged by a detent $g^5$, connected to the armature $g'$ by a link $g^6$. This detent prevents the pointer from advancing for more than one space at each motion of the electromagnet. A second detent $g^7$, engaging the wheel $g^3$, prevents back motion of such wheel.

In addition to the arm $b$, we have shown the table $a$ to be provided with a number of object-balls $j$ suspended from a rail $j'$, which is stretched across the rear end of the table.

The arm $b$ as well as one of these balls must be hit to make a count. The play-ball is received within a rear gutter $k$, and is thence returned to the hands of the player by an inclined gutter $k'$, which is arranged beneath the lower side of the table.

Of course the game may be played in a variety of ways, the essence of the invention being found in the rotating arm that is adapted to be struck by the play-ball and operates the pointer, which gives rise to a number of interesting and difficult combinations.

What we claim is—

1. The combination of a billiard-table with a revoluble arm having a spindle that projects through the table, a dial connected to the table, a pointer adapted to move over the dial, and means for connecting the depending end of the arm-spindle to the pointer in such a manner that a revolution of the arm will cause a partial revolution of the pointer, substantially as specified.

2. The combination of a billiard-table with a revoluble arm having a spindle that projects through the table, an insulating-ring having a metal contact and embracing the depending section of the spindle, a revoluble contact-spring operated by the spindle, a dial connected to the table, a pointer adapted to move over the dial, a battery, and circuit-wires that connect the battery with the insulating-ring, contact-spring and pointer, substantially as specified.

3. The combination of a billiard-table with a revoluble arm having a spindle that projects through the table, an insulating-ring having a metal contact and embracing the depending section of the spindle, a revoluble contact-spring operated by the spindle, a dial connected to the table, a pointer, a battery, circuit-wires, and a circuit-closer in circuit at the front of the table, which is adapted to interrupt the electric connection between revolving arm and pointer, substantially as specified.

WILHELM MUMBRAUER.
EDMUND MUMBRAUER.

Witnesses:
F. V. BRIESEN,
W. G. WHITING.